United States Patent [19]

Williams et al.

[11] 3,830,450

[45] Aug. 20, 1974

[54] DUAL PURPOSE CIRCULATION CONTROL AIRFOIL

[75] Inventors: Robert M. Williams, Chantilly, Va.; Robert J. Englar, Gaithersburg, Md.

[73] Assignee: The United States of America as represented by the Secretary of the Navy, Washington, D.C.

[22] Filed: Dec. 15, 1972

[21] Appl. No.: 315,722

[52] U.S. Cl........ 244/42 CD, 244/42 CC, 416/90 A
[51] Int. Cl............................................. B64c 21/04
[58] Field of Search......... 244/42 CC, 42 CD, 40 R, 244/130; 416/90 R, 90 A

[56] References Cited
UNITED STATES PATENTS

| | | | |
|---|---|---|---|
| 2,885,160 | 5/1959 | Griswold | 244/40 |
| 2,939,650 | 6/1960 | Coanda | 244/42 CD |
| 2,946,540 | 7/1960 | Coanda | 244/42 CD X |
| 3,016,213 | 1/1962 | Griswold | 244/42 CC |
| 3,045,947 | 7/1962 | Bertin | 244/42 CC X |
| 3,168,997 | 2/1965 | Saunders | 244/42 CC X |

OTHER PUBLICATIONS

Shapiro, Ascher H., "The Dynamics and Thermodynamics of Compressible Fluid Flow," Ronald Press Co., New York, 1958, See pp. 75–86, 89–95, 109.

*Primary Examiner*—Duane A. Reger
*Assistant Examiner*—Barry L. Kelmachter
*Attorney, Agent, or Firm*—R. S. Sciascia; Q. E. Hodges

[57] ABSTRACT

A dual purpose circulation control airfoil is designed for operation at high speeds in the vicinity of transonic speed and for low speed applications such as landing speeds. A blunt trailing edge possesses a varying radius of curvature to comprise a high speed and low speed coanda surface. For high speed operation, air is blown from a slot over the high speed surface, moving upper surface stagnation point further aft and increasing lift. At low speed operation air is blown over the low speed surface to produce high lift for low landing speeds. In addition, a surface forward of the blunt edge is provided for supersonic expansion in transonic flight.

3 Claims, 1 Drawing Figure

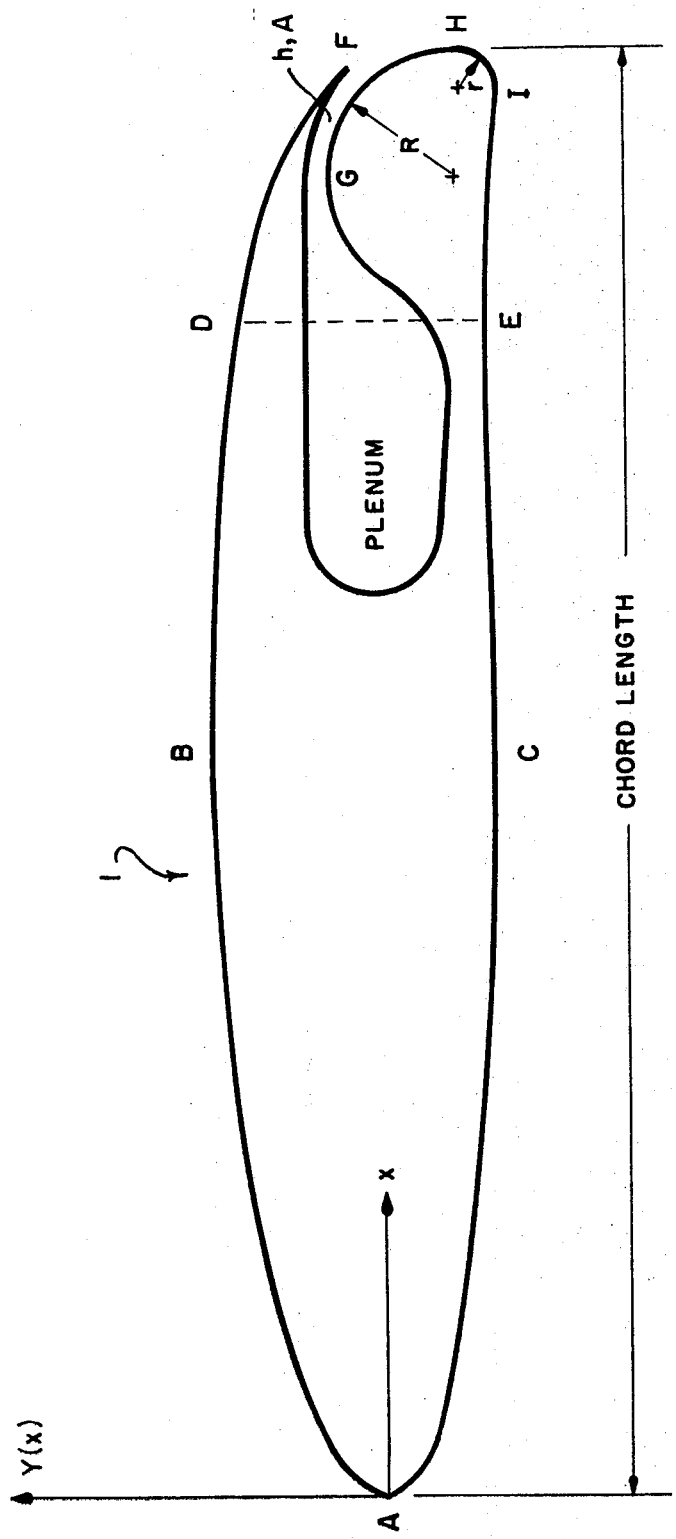

DUAL PURPOSE CIRCULATION CONTROL AIRFOIL

The invention described herein may be manufactured and used by or for the Government of the United States of America for governmental purposes without the payment of any royalties thereon or therefor.

BACKGROUND OF THE INVENTION

Circulation control airfoils are well known in prior art. These prior art devices have employed mechanical systems for changing the geometry of the airfoil for use over a wide range of speeds.

Mechanical methods add weight to an airfoil incurring a high price for variable flow in a heavier than air aircraft. In addition, mechanical means for changing airfoil geometry pose the additional requirement of motive means and additional power requirements to physically move the mechanical means.

SUMMARY OF THE INVENTION

This invention is a fixed geometry wing employing a blunt trailing edge having a plurality of Coanda surfaces for Circulation Control blowing. The appropriate surface is selected for low speed and high speed application by controlling the velocity or mass flux of air from the slot and by designing the airfoil and its slot to conform to preestablished design criteria.

The airfoil employs a slot along its blunt trailing edge and adjacent to it. In the direction of the chord and immediately aft of the slot is a high speed coanda surface. Proceeding in the direction of the chord line and aft of the slot, the radius of curvatures changes and the high speed Coanda surface merges into a low speed Coanda surface. During low speed applications such as in landing, the momentum of the air from the slot is varied and the circulation control blowing is such that the air from the slot adhere to the high speed surface and low speed surface, curving down around the blunt edge, and detaching at a point on the under surface of the airfoil, as in conventional circulation control blowing.

Accordingly, a first object of this invention is an airfoil which may be used for circulation control blowing at low and high speeds.

A second object of this invention is an airfoil usable at low landing speeds and which may be so used without movement of any mechanical parts.

A third object of this invention is a dual purpose circulation control airfoil which may be used at low landing speeds and high forward flight speeds by changing the velocity of the air from the blowing slot.

BRIEF DESCRIPTION OF THE DRAWINGS

The FIGURE shows a cross section of the circulation control airfoil, having a chord length L.

DESCRIPTION OF THE INVENTION

A circulation control airfoil as shown in the FIGURE has a leading edge A and a trailing edge H. In describing the airfoil the leading edge is considered the origin of an x–y axis, and wherein the x axis corresponds to the chord line and with the length of the chord being L. The surface is described by the following relationship:

(1) $y(x) = \pm a_0 + a_1 x + a_2 x^2 + \ldots + a_7 x^n$ where $y(x)$ is the distance of any point on the upper or lower surface from the x axis, corresponding to the chord, and $x$ is a point on the chord. The slope $(dy/dx)$ in this region is typically small after $(x_1 - x_0) \geq 10$ percent of the chord where $x_1$ is a selected point and $x_0$ is the origin with the curvature decreasing toward point B on the upper surface. Similarly, in region Z–C, the slope $(dy/dx)$ is typically small after $(x_1 - x_9) \geq 10$ percent of the chord and decreases towards point C on the lower surface.

In region B–D on the upper surface and C–E on the lower surface, there is little or no curvature and the surface is designed for smooth flow deceleration to the trailing edge and minimization of boundary layer build up or flow separation.

The region A–D on the upper edge and A–E on the lower edge, in most cases, will be a conventional section designed for cruise, high speed flight maneuverability and which can include the innovated super critical "roof top" airfoil.

The section of the airfoil from point D down around the trailing edge to E on the lower surface is the subject invention of this application.

The upper surface D–F is designed to allow additional supersonic expansion of the flow during transonic flight. In transonic flight the shock wave is pulled aft under the effect of circulation control blowing. Surface D–F permits additional supersonic expansion and prevents the shock from impinging on the jet and causing jet detachment.

The expansion surface is described by equation (1) with respect to the chord and the leading edge, and with the conditions that $f_1(x) < (d^2y/dx^2) < f_2(x)$ where $f_1(x)$ is the curvature of surface B–D and $f_2(x)$ is the surface curvature where shock interaction or flow separation occurs in the absence of circulation control blowing.

The contoured supersonic slot is shown within region G–F. The blowing slot, by definition herein, extends aft to the sharp point at F on the upper surface of the airfoil. For a given blowing momentum coefficient $C\mu$ and a slot throat height $h$ related by $C\mu = (\dot{m} V_j / q_\infty S) = 2(h/c)(\rho_j/\rho_\infty)(V_j/V_\infty)^2$ where $q_\infty$ is the freestream dynamic pressure; $h$ is the slot height; $S$ is the plan form area of the airfoil; $\rho_j$ is the blown jet density, and $\rho_\infty$ is the free stream density, $V_\infty$ is the free stream velocity and $V_j$ is the jet stream velocity.

The mass flux $\dot{m}$ and jet velocity $V_j$ are defined as $$\dot{m} = A^* P_t \left\{ \frac{2\gamma}{(\gamma-1) R T_t} \left[ \left(\frac{P}{P_t}\right)^{2/\gamma} - \left(\frac{P}{P_t}\right)^{(\gamma+1)/\gamma} \right] \right\}^{1/2}$$

where $A^*$ is the nozzle area where the jet Mach number is 1 and, $$V_j = \left\{ 2 R T_t \left(\frac{\gamma}{\gamma-1}\right) \left[ 1 - \left(\frac{P}{P_t}\right)^{\gamma-1/\gamma} \right] \right\}^{1/2}$$

constants and $T_t$ is the duct temperature.

The supersonic slot is designed using the above relationships to produce a desired Mach number $(M_j)$ (a function of $(V_j)$ or pressure ratio $(P/P_t)$ yielding the desired $C_\mu$ and yet which prevents shock down and pressure rise in the jet. This phenomena can occur downstream of a simple divergent nozzle resulting in jet detachment, loss of jet turning and loss in performance. For a given jet mach number or pressure ratio the supersonic slot is designed from the following relationship:

$$\frac{A^*}{A} = \frac{1}{M_j}\left[\frac{2}{\gamma-1}\left(1+\frac{\gamma-1}{2}M_j^2\right)\right]^{(\gamma-1)/2(\gamma-1)} = \left[\left(\frac{P}{P_t}\right)^{2/\gamma} - \left(\frac{P}{P_t}\right)^{\gamma+1/\gamma}\right]^{1/2} \bigg/ \left[\left(\frac{2}{\gamma-1}\right)^{\gamma+1/2(\gamma-1)}\left(\frac{\gamma-1}{2}\right)^{1/2}\right]$$

where A is the local slot area.

This relation governs the shape of the upper and lower surfaces in region G–F.

The high speed coanda surface is F–H and it is the region immediately downstream and most influenced by the supersonic slot. This is the effective coanda surface in high speed flight where large pressure ratios ($Pt/p$) (duct total pressure/exit static pressure) are needed for transonic blowing effectiveness. The following nondimensional parameters govern the design of this surface with the primary criteria being to maintain an attachment of the jet to the surface.

$0 < h/R \le 0.01$; $P_t/p > 1.5$ $0 < C\mu \le 0.03$ for $M\infty > 0.5$; $0.02 < R/C < 0.10$ The high speed surface radius of curvature is R and slot height is $h$ as shown in the FIGURE.

The low speed coanda surface is region H–I having a radius of curvature $r$ as shown in the FIGURE. At low speed the jet will easily remain attached to region F–H. At low speeds, however, attachment criteria must be met in region H–I for the jet to adhere to the lower surface and detach from the airfoil at some point on the underside of the airfoil. Pressure ratios are much lower for coanda effectiveness at low velocity and the surface radius can be held smaller than the radius R of the high speed coanda surface. The criteria for the low speed coanda surface in region H–I is governed by the following parameters:

$0 < h/r < 0.05$; $0 < C\mu \le 0.20$ $1.0 < Pt/p \le 1.5$; $0.01 < r/c \le 0.04$

The lower surface region E–I is dependent upon the design of the trailing edge and the upper surface. The determination of R, r, h, $C\mu$ and the curvature of D–F will predetermine the required thickness of the trailing edge junction line D–E. If this thickness is not sufficient on the upstream section, surface E–I may be required to be concave to allow proper matching. In addition, the surface slope ($dy/dx$) must be continuous at points E and I.

The airfoil includes means for blowing air out of the slot and over the coanda surfaces and for controlling the detachment point of said fluid flow from the coanda surface on the airfoil. These means are well known in the art and do not need to be described here in this application directed to the slot and airfoil surfaces.

Obviously many modifications and variations of the present invention are possible in the light of the above teachings. It is therefore to be understood that within the scope of the appended claims the invention may be practiced otherwise than as specifically described.

What is claimed is:

1. A dual purpose circulation control airfoil having a trailing edge and including a trailing edge blowing slot for circulation control blowing over a blunt tail surface;

said blunt tail surface comprising a high speed coanda surface for receiving supersonic circulation control blowing from said slot and a low speed coanda surface for receiving subsonic circulation control blowing from said slot;

wherein said high speed coanda surface has a first radius of curvature, is adjacent said slot and extends aft of said slot where it merges into said low speed coanda surface, said low speed coanda surface having a second radius of curvature and extending aft of said high speed coanda surface and merging into the lower surface of said airfoil;

said first radius of curvature being larger than said second radius of curvature;

whereby during supersonic circulation control blowing over said high speed coanda surface the supersonic air flow discharged from said blowing slot remains at least partially attached to said high speed surface so as to relocate the stagnation point further aft on the airfoil and increase lift during high speed flight in the vicinity of transonic speeds; and during subsonic circulation control blowing the subsonic airflow discharged from said slot remains attached to said high speed and said low speed coanda surface and detaches at a point on the under surface of the airfoil.

2. The airfoil of claim 1, wherein:

said high speed coanda surface is curved so as to maintain attachment of the supersonic air flow discharged from said slot according to the following relationship within the ranges given:

$0 < h/R \le 0.01$ $0 < C\mu \le 0.03$ (for $m\infty > 0.5$)$Pt/P > 1.5$ $0.02 < R/c < 0.01$ where $h$ is the height of the slot;

R is the radius of curvature of the high speed coanda surface;

$P_t$ is the slot duct total pressure;

P is the exit static pressure; $C\mu$ is the blowing momentum coefficient; $M\infty$ is the free stream Mach number; c is the chord length.

3. The airfoil of claim 2, wherein:

said low speed coanda surface is curved so as to maintain attachment of the subsonic air flow discharged from said slot according to the following relationship within the ranges given: $0 < h/r \le 0.05$ $0 < C\mu \le 0.20$ $1.0 < Pt/P \le 1.5$ $0.01 < r/c \le 0.04$ where $r$ is the radius of curvature of said low speed coanda surface.

* * * * *